United States Patent
Gardner et al.

[11] Patent Number: 5,577,699
[45] Date of Patent: Nov. 26, 1996

[54] HANGER AND METHOD OF ATTACHMENT

[76] Inventors: Lawrence C. Gardner, 24 Elliott Rd., Sterling, Mass. 01564; Philip Nigro, Jr., 1 Cricket La., Worcester, Mass. 01602

[21] Appl. No.: 301,487

[22] Filed: Sep. 7, 1994

Related U.S. Application Data

[63] Continuation-in-part of Ser. No. 79,986, Jun. 18, 1993, abandoned.

[51] Int. Cl.⁶ ..................................... F16B 2/00
[52] U.S. Cl. .................. 248/218.3; 248/217.2; 248/302; 248/218.2
[58] Field of Search ............... 248/218.3, 217.2, 248/302, 684, 685, 546, 110, 112, 316.5, 218.2, 231.5; 24/551, 552, 556, 546

[56] References Cited

U.S. PATENT DOCUMENTS

| | | | |
|---|---|---|---|
| 359,953 | 3/1887 | Atwood | 248/217.2 |
| 782,346 | 2/1905 | Lantz | 24/551 |
| 1,105,855 | 8/1914 | Smith | 248/231.5 |
| 1,227,597 | 5/1917 | Ellis | 248/302 X |
| 1,507,980 | 9/1924 | Yetter | 248/684 |
| 3,398,919 | 8/1968 | Tokar | 248/316.5 X |
| 3,517,417 | 6/1970 | Kachel | 248/218.3 X |
| 4,015,809 | 4/1977 | Buril | 248/217.2 |
| 4,236,688 | 12/1980 | Wilk | 248/218.3 X |
| 4,667,913 | 5/1987 | Peelle et al. | 248/302 X |
| 5,054,728 | 10/1991 | Nigro, Jr. | 248/302 X |

FOREIGN PATENT DOCUMENTS 980118   12/1950   France ................................. 248/302

*Primary Examiner*—Karen J. Chotkowski
*Attorney, Agent, or Firm*—William Nitkin

[57] ABSTRACT

A hanger for engagement on a support member having a front face and first and second parallel sides, such hanger having a load-bearing portion and a support member engagement portion, such support member engagement portion formed with a fulcrum and arm members attached to hook members having sharpened ends which hanger, when engaged on the support member with the fulcrum against the front face of the support member, causes the support member engagement portion when a load is placed on the load-bearing portion to rotate on the fulcrum, exerting leverage to embed the sharpened ends into the first and second parallel sides of the support member.

7 Claims, 6 Drawing Sheets

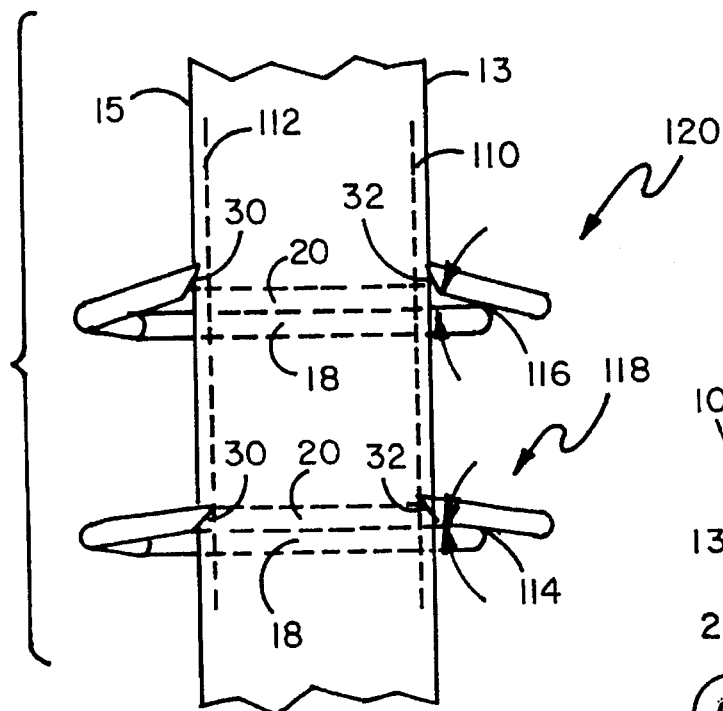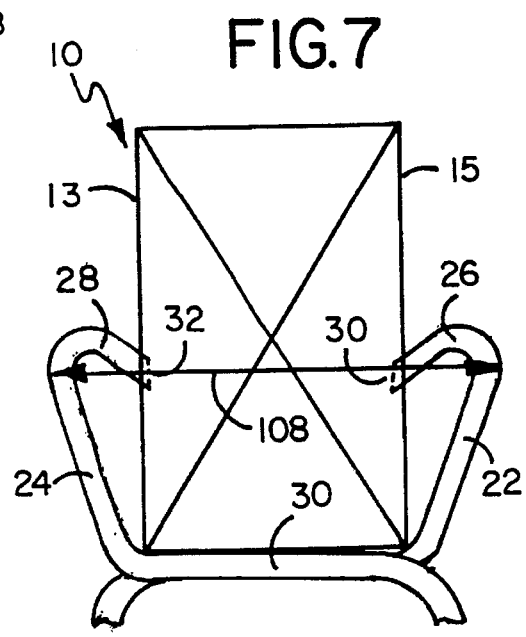
FIG. 8
FIG. 7

HANGER AND METHOD OF ATTACHMENT

This application is a continuation-in-part of our previous application for a Stud Hanger, Ser. No. 08/079,986 filed Jun. 18, 1993, now abandoned.

BACKGROUND OF THE INVENTION

1. Field of the Invention

The device and method of attachment of this invention reside in the area of hangers for supporting and suspending items and more particularly relate to wire-formed hangers which are manually affixable to a variety of support members.

2. Description of the Prior Art

At present to hang, support or suspend items on a stud, joist, rafter or similar support member, one can drive a nail or screw a hook into such members and hang items on the protruding end of such nail or hook. Exposed wooden studs and joists are frequently found in unfinished building areas such as the inside of garages and basements; and household items such as tools, mops, brooms, bicycles and the like are frequently hung thereon. Anchoring devices such as disclosed in U.S. Pat. No. 4,236,688 to Wilk are also known to support items from overhead joists.

SUMMARY OF THE INVENTION

It is a goal of this invention to provide an economical hanger formed in one embodiment of a single unitary piece of spring wire or equivalent strong, resilient material, the support member engagement portion of which can be quickly, easily and efficiently manually attached to, and detached from, a wooden stud, joist or other wooden support member to provide a weight-bearing fixture for placement and retention thereon of a desired item such as a tool or the like. Integrally and contiguously formed with the support member engagement portion in a plane forward therefrom is a load-bearing portion which can be of many different configurations depending on the nature of the item to be hung, supported or suspended therefrom.

It is a further object of this invention that the support member engagement portion of the device of this invention be manually engageable onto, and when desired removed from, the stud, joist or other support member without requiring the use of a tool for such removal.

It is also a fundamental goal of this invention to provide a hanger and method of attachment of its support member engagement portion which hanger not only provides for increasingly strong attachment to the support member as the weight of the hung, supported and/or suspended load thereon is increased but also locks into place on the support member to prevent lateral movement which movement might cause articles suspended therefrom to fall and be damaged. Further, the relative angle of attachment of the hanger to the angular position of the support member, vertical to horizontal or any angle therebetween, does not affect the attachment method, or influence the physical security of the attachment of the hanger to the support member.

It is a still further object of the invention that the formation of the support member engagement portion of the hanger can be, but not necessarily, fabricated as a single unitary wire formed to have its load-bearing portion provide a wide variety of load-bearing configurations. The invention herein needs only sufficient residual tension from the natural spring characteristics of the formed wired to retain its own weight in place until such time as the load to be supported, or downward force, is applied to the load-bearing portion, at which time the hanger will, because of its mechanical design characteristics, provide the mechanical advantage necessary to securely attach itself with the load it supports to a stud or other support member. The hanger of this invention relies primarily on the uniqueness of a combination of mechanical leverage principles to retain it securely in place on a support member and does not rely solely on the inherent resilient spring characteristics of the wire to hold it in place. The design of the hanger of this invention utilizes the load's weight or pressure exerted downward thereon to provide increased force to secure the hanger to the support member by levering the load's natural downward force.

BRIEF DESCRIPTION OF THE DRAWINGS

FIG. 7 illustrates a top view of the support member engagement portion of the hanger of FIG. 6 after a load has been hung from its load-bearing portion.

FIG. 8 illustrates a rear view of two hangers of this invention engaged on a stud, the upper hanger having no load placed thereon and the lower hanger having a load placed thereon.

DESCRIPTION OF THE PREFERRED EMBODIMENT(S)

Figure 1:
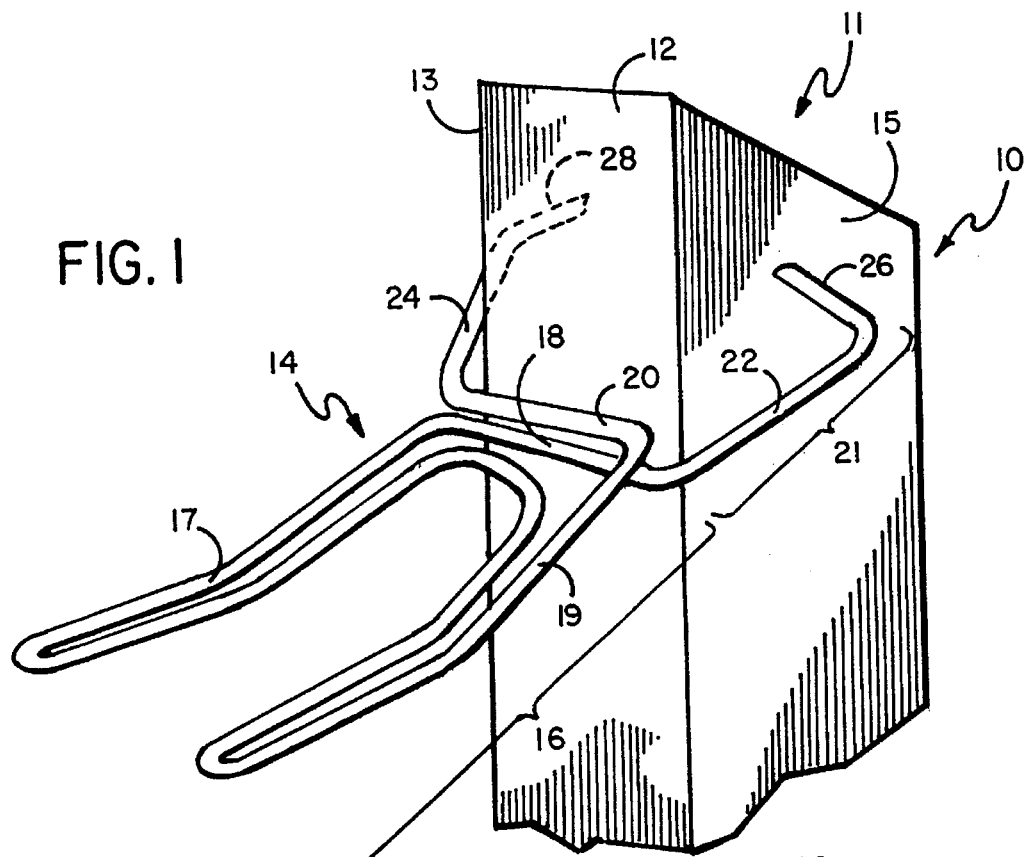
FIG. 1 illustrates a perspective view of one embodiment of the hanger of this invention engaged to a stud, showing one configuration of the load-bearing portion.
Figure 2:
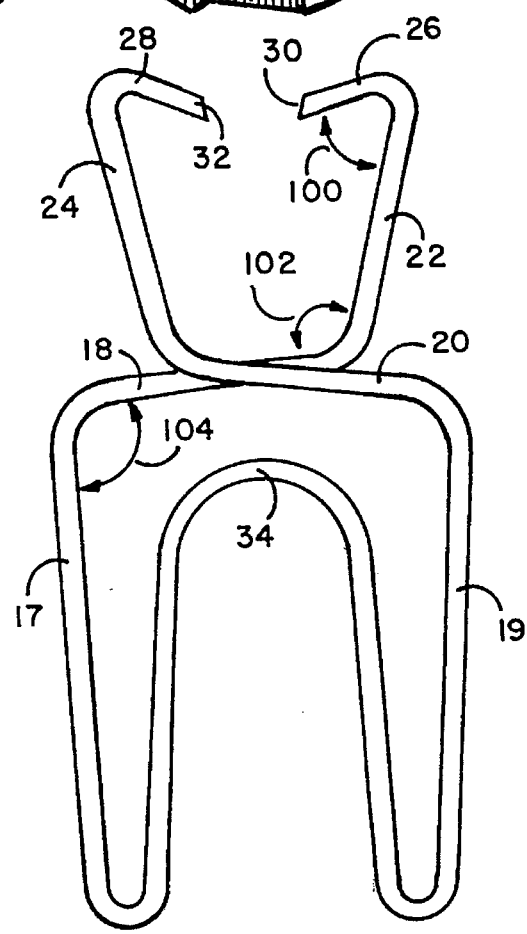
FIG. 2 illustrates a top view of the hanger of FIG. 1.

Seen in FIG. 1 is support member 11 which can be a standard 2"×4" stud 10 being approximately 1½" wide×3½"

deep having front face 12 with opposing parallel first and second sides 15 and 13 which size stud is most frequently utilized in building construction. Other types and sizes of support members can also be utilized with the hanger of this invention such as joists, rafters and the like which can be disposed at any angle. Engaged to stud 10 on opposing first and second sides 15 and 13 thereof is hanger 14 of this invention formed in this embodiment of a single piece of spring wire which has a load-bearing portion 16 comprised of first and second load supports 17 and 19 which extend, respectively, to form first and second cross members 18 and 20 which cross one another, and are each generally positioned at right angles to first and second load supports 17 and 19. Spring wire of approximately ⅛ inch diameter has been found to work satisfactorily. Extending upward from the ends of first and second cross members 18 and 20, each at an angle of approximately 108 degrees, are first and second arm members 22 and 24 terminating, respectively, with downwardly and inwardly directed first and second hook members 26 and 28 which have, respectively, first and second sharpened ends 30 and 32, as seen in FIG. 2. First and second cross members 18 and 20 with first and second arm members 22 and 24 and first and second hook members 26 and 28 combine to form support member engagement portion 21. First and second load supports 17 and 19 form load-bearing portion 16.

Figure 3:
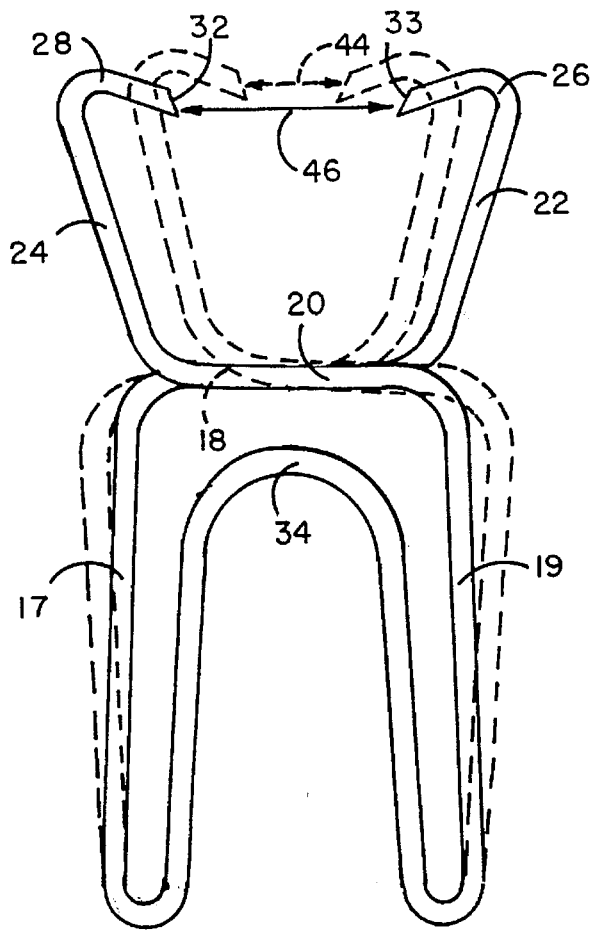
FIG. 3 illustrates a top view of the hanger of FIG. 2 with the load-bearing portion having been manually squeezed, causing the arm members and hook members of the support member engagement portion to spread apart to encompass the two parallel sides of a support member.

Portions of the hanger of FIG. 2 are indicated by dashed lines in FIG. 3. After manual squeezing of the exterior sides of first and second load supports 17 and 19, as seen in FIG. 2, first and second cross members 18 and 20 are moved inward, thereby causing first and second arm members 22 and 24 to spread apart a distance 46 as seen in FIG. 3. When first and second load supports 17 and 19 are released, the inherent tendency of the spring wire to return to its original shape causes the entire structure to try to return to its former unsqueezed state, such former position shown by the dashed lines in FIG. 3.

Figure 4:
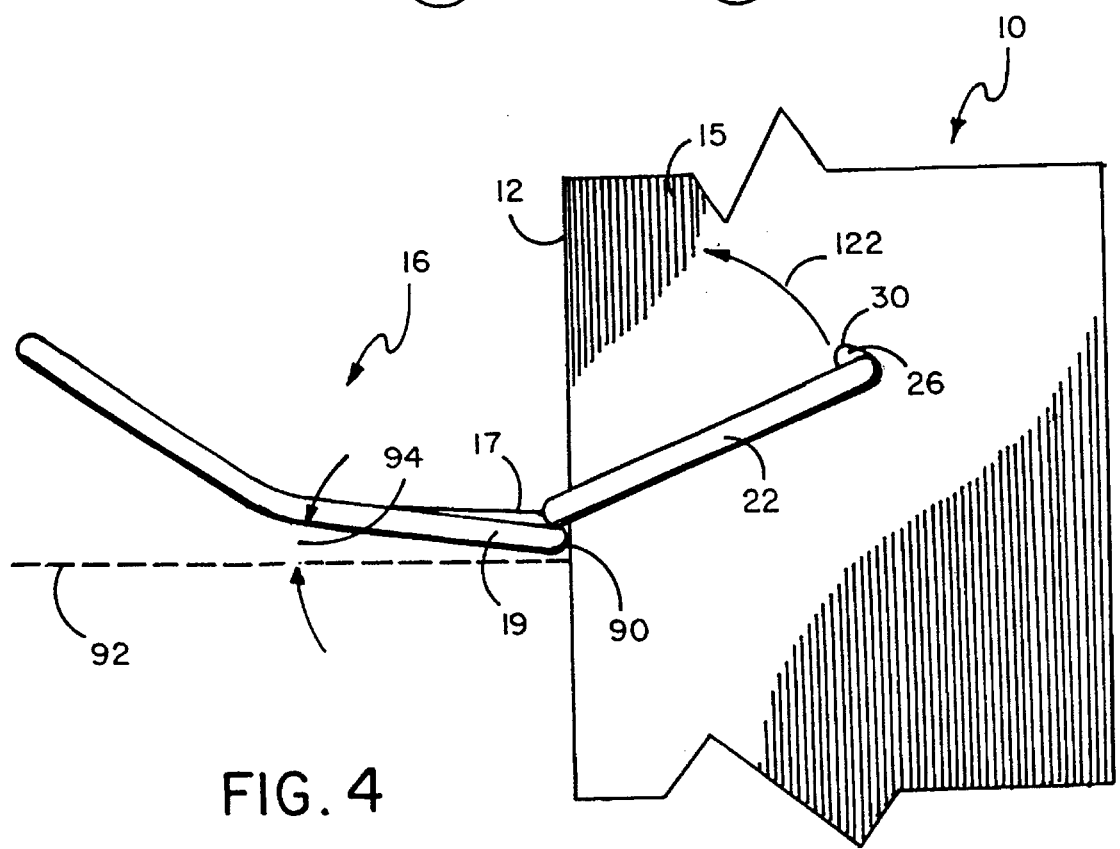
FIG. 4 illustrates a side view of the hanger of FIG. 2 mounted on a stud before a load is hung on the load-bearing portion.
Figure 5:
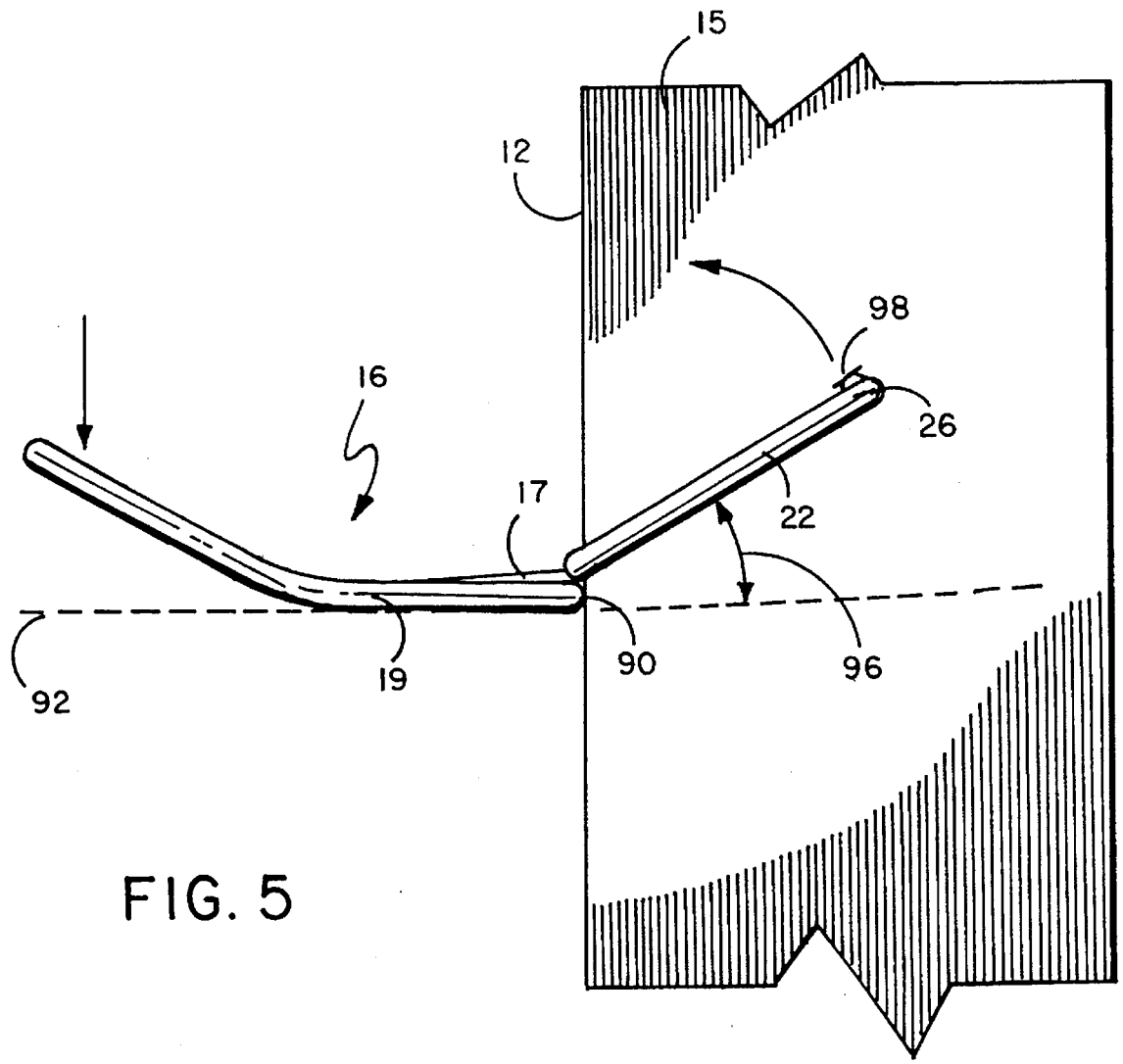
FIG. 5 illustrates a side view of the hanger of FIG. 4 after a load has been hung on the load-bearing portion.
Figure 9:
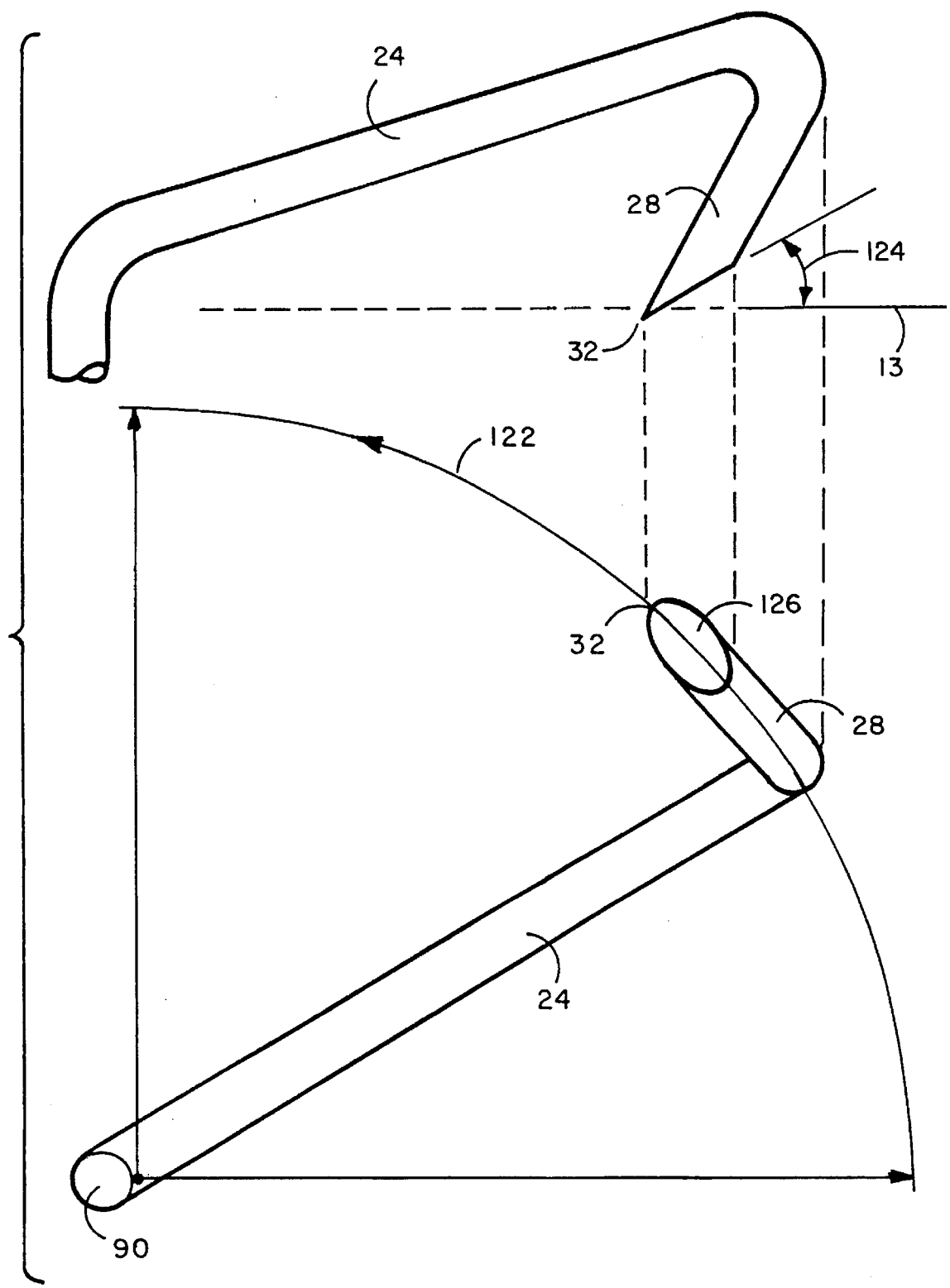
FIG. 9 illustrates two views of an arm member and its associated hook member of the hanger of this invention showing the angle at which the end of the hook member is cut and the path of the movement of the major axis of the elliptical face of the sharpened end of the hook member when downward force is placed on the load-bearing portion which load-bearing portion is not shown in this Figure.

When the hanger, as illustrated in FIG. 3, is to be engaged to a stud or other support member, one manually squeezes inward on the exterior sides of first and second load supports 17 and 19, indicated by dashed lines of the load-bearing portion 16 of the hanger, causing the reciprocating action of first and second cross members 18 and 20 moving inward by one another and causing a reciprocating opposite spreading-apart movement of first and second arm members 22 and 24 and first and second hook members 26 and. 28 which spread apart a distance 46 which is greater than the distance 44 of their original spacing from one another to be at least as wide as the width of the front face of the stud or other support member on which the hanger is to be affixed. Before releasing manual pressure on the exterior sides of first and second load supports 17 and 19, one places the hanger, for example, in front of the front face of the stud on which one wishes to support an item and pushes the hanger onto the stud such that the stud is positioned, as seen in FIG. 4, between first and second arm members 22 and 24 and with its front face 12 contacting first and second cross members 18 and 20. Only one side of the hanger in use is illustrated in FIGS. 4 and 5. One then releases the inward pressure on the exterior sides of first and second load supports 17 and 19, causing the downwardly inward and forwardly disposed first and second sharpened ends 30 and 32, respectively, of first and second hook members 26 and 28 to engage, respectively, into first and second sides 15 and 13 of the wooden stud. Then by placing a load on load-bearing portion 16 or by manually exerting downward pressure on load-bearing portion 16 of the hanger, first and second arm members rotate in an arc, as seen in FIG. 9, causing first and second sharpened ends 30 and 32 become further embedded into the wooden stud with first and second cross members 18 and 20 positioned against front face 12 of the stud acting as a fulcrum 90 to cause a levering action between first and second hook members 26 and 28 and load-bearing portion 16. First and second sharpened ends 30 and 32 of the hook members, after initial release of manual pressure on the exterior sides of load-bearing portion, are somewhat engaged to the stud by the spring wire's inherent natural resiliency, but they are much more deeply embedded by the second action of downward pressure being exerted on load-bearing portion 16 to securely embed first and second sharpened ends 30 and 32 into the stud as described further below. The depth at which the sharpened ends can be embedded into a support member is a function of the angle and length of the sharpened ends of the hook members, the amount of downward pressure exerted on the load-bearing portion, and the hardness of the wood of the support member. First and second hook members 26 and 28 can each extend downwardly inward and forward toward the load-bearing portion at a compound angle from their respective arm members, as described further below, forming an acute angle thereto so that the hook members are aimed slightly downward to the sides of the support member. In a preferred embodiment the hook members can extend inward approximately ½ inch and downward at approximately a 55-degree angle and also be angled somewhat toward the load-bearing portion, forming a compound angle as described further below, to better dig into a wooden stud or other support member. The hanger of this invention can be easily and quickly removed manually without tools by a combined squeezing and upward lifting action of the load-bearing portion which combined action disengages the sharpened ends of the hook members from the first and second sides of the support member.

Load-bearing portion 16 of the hanger of this invention can be of many configurations, some of which configurations are taught in U.S. Pat. No. 5,054,728 of Nigro, one of the coinventors herein. Such configurations are determined by the number of bends placed in the length of the wire below the cross members whereas the support member engagement portion remains the same cross members whereas the support member engagement portion remains the same for all configurations of the hanger of this invention, being comprised of the cross members, the arm members, the hook members and their sharpened ends.

FIG. 4 illustrates a side view of the device of this invention installed on a support member, being stud 10. Seen in this view is first side 15 into which is engaged first hook member 26 attached to first arm member 22 with the cross members, not seen, forming fulcrum 90 resting against front face 12 of stud 10. Between load-bearing portion 16 and a horizontal line 92 is formed an angle 94 which, as a load is placed on load-bearing portion 16, the load pulls downward on the outwardly extending first and second load supports 17 and 19 causing the load-bearing portion to rotate on fulcrum 90 which rotation, in turn, causes the hook members such as first hook member 26 to move upward along arc 122, also illustrated in FIG. 9. In FIG. 5 it is seen that the upper portion of load-bearing portion 16 has been moved down to be aligned with horizontal line 92, causing angle 96 between first arm member 22 and horizontal line 92 to increase, causing the sharpened end of first hook member 26 to dig into first side face 15 of stud 10 at point 98 so that it is embedded therein.

Figure 6:
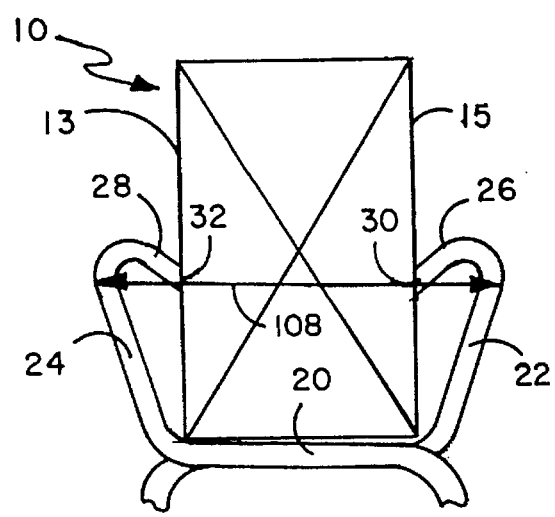
FIG. 6 illustrates a top view of the support member engagement portion of the hanger and cross-section of a stud on which it is engaged before a load is hung from its load-bearing portion.

FIGS. 6 and 7 further illustrate this embedding action of first and second sharpened ends 30 and 32 into stud 10. FIG.

6 illustrates a top view of the hanger on stud 10 seen in cross-section before any weight is applied to the load-bearing portion, not seen in this view, wherein initially first and second sharpened ends 30 and 32 are disposed on first and second sides 15 and 13 of stud 10, and first and second arm members 22 and 24 are spread apart a distance 106. When a load is applied to load-bearing portion 16, also not seen in FIG. 7, it causes first and second sharpened ends 30 and 32 to dig into first and second sides 15 and 13 of stud 10, as shown in dotted lines in FIG. 7, which action decreases the distance 108 between the arm members from the distance 106, as seen in FIG. 6.

This same action is illustrated in the rear view of FIG. 8 which also shows the compound angles that are utilized in the hanger of this invention wherein the hook members are not only disposed at approximately a 55-degree angle 100 from their associated arm members, as seen in FIG. 2, but also, as seen in upper embodiment 120 in FIG. 8, the hook members extend forward an angle 116 such that the sharpened ends thereof start to dig into first and second sides 15 and 13 of the stud when the hanger is initially attached to the stud. As illustrated in the lower embodiment 118, when a load is placed on the unseen load-bearing portion of the hanger of this invention, the sharpened ends now dig further into the first and second sides of the stud and decrease the original angle 116 of the hooks to be disposed at a more acute angle 114, causing the sharpened ends to dig into the first and second sides of the stud a distance extending to dotted lines 110 and 112 and causing a decrease in the angle of the forwardly bent hook members so they are more directly driven into the support member.

Figure 10:
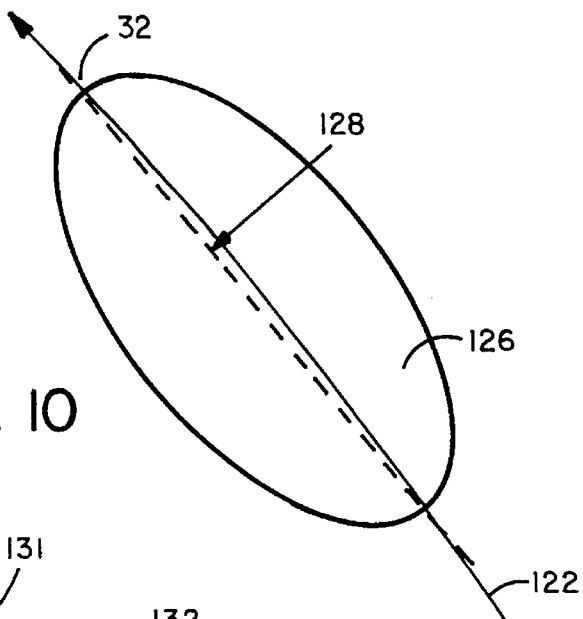
FIG. 10 illustrates a side view of the sharpened end of the hook member showing its elliptical shape and path of movement during installation.

In the upper portion of FIG. 9 second sharpened end 32 at the end of second hook member 28 is seen cut at angle 124 to the plane of second side 13 of the support member. In a preferred embodiment angle 124 should be within a range of 10–50 degrees. When such angled cut is made through a round spring wire, it forms an elliptical face 126, as seen in the lower portion of FIG. 9, which illustrates one side of the hanger in use with a load being placed on the load-bearing portion and with the cross members acting as a fulcrum 90 against the front face of the support member with arm member 24 forming the radius to have hook member 28 move through arc 122. Elliptical face 126, as illustrated in FIG. 10, has a major axis 128 therethrough. It has been found that if major axis 128 of elliptical face 126 follows along arc 122, second sharpened end. 32 will dig properly and become securely embedded in the support member. It is important that second sharpened end 32 of second hook member 28 be cut to be at such an angle as described above so that the major axis 128 of elliptical face 126 will be aligned with arc 122 of the movement of the hook member.

The compound angle at which each hook member is disposed to its associated arm member where it bends both downwardly inward and forward is best seen in embodiment 120 in FIG. 8. This compound angle creates a chiseling action that further embeds each sharpened end into the support member as downward pressure is placed on the load-bearing portion. The successful and secure attachment of the hanger is critically dependent both on the fulcrum action of the cross members against the front face of the support member and the preset compound angle of the hook members and the angle at which their ends are cut. As the load increases on the load-bearing portion, the hanger continues its digging action. Such increased digging-in action of each sharpened end continues as the weight of the load increases until there is either a failure of material or failure of the support member which failure is exceedingly rare in normal use of the hanger of this invention. Further, it should be noted that the compound angle of the hook members as their sharpened ends penetrate and are embedded in the support member, utilize a cam-over action which causes a rearward bending of each hook member from its forward angular position. This bending helps increase the penetration of the hook members' sharpened ends into the support member driven by the weight of the load. By definition, the load can be any object having weight placed on the load-bearing portion or can be a manually applied downward force on the load-bearing portion. The penetration of the hook members by such cam-over action decreases the separation of the sharpened ends of the hook members from each other and causes an increased secondary penetration from the load on the load-bearing portion, thereby increasing the security of the attachment.

Figure 11:
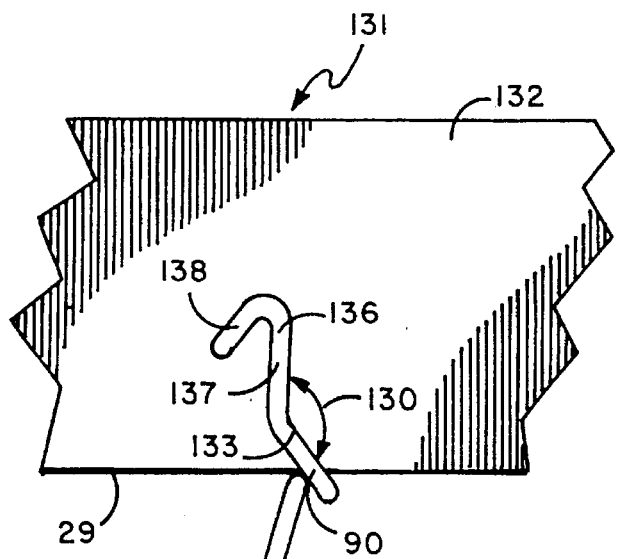
FIG. 11 illustrates a side view of a hanger of this invention mounted on an overhead joist showing the angular bend of the arm member to aid in levering the sharpened ends of the hook members into the joist.

It should be noted that the device of this invention can also be suspended from overhead joists such as joist 131 seen in FIG. 11 or from a support member disposed at any angle. In FIG. 11 load-bearing portion 16 hangs down below joist 131 and fulcrum 90 rests upon lower face 29 of joist 131 with hook member 138 adapted to be embedded in side 132 of Joist 131. In a preferred embodiment it has been found that if the upper portion of arm 136 is bent at an angle 130 of approximately 150 degrees to the lower portion 133 of arm 136, it will cause hook member 138 to better dig into side 132 of joist 131 at a more vertical position to the fulcrum than if the arm member were straighter. This feature provides a more secure engagement of the hanger on an overhead support member.

Figure 12:
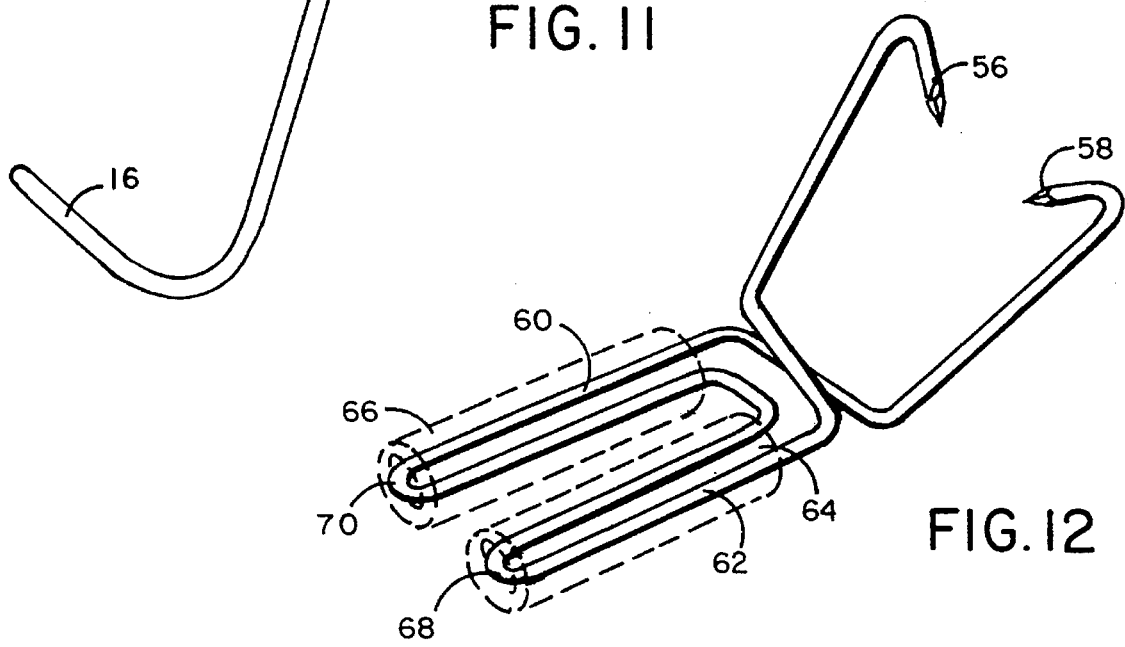
FIG. 12 illustrates a perspective view of an embodiment of the hanger of this invention showing the hook members with diamond-pointed ends.

FIG. 12 illustrates a perspective view of a further embodiment of the hanger of this invention showing first and second diamond-pointed ends 58 and 56 and first and second rubber sleeves 66 and 64 shown in outline form fitting over the first and second protruding load-supporting portions 60 and 62. Rubber sleeves can be provided as protective cushioning for whatever item is to be retained on the load-bearing portion of the hanger of this invention. It should be noted in this view that part of the force for urging first and second diamond-pointed ends 58 and 56 into a support member upon the release of manual, lateral compression on the sides of dual-protruding portions 60 and 62 is caused by the tension created by bending of the spring wire at points 68 and 70. This tension initially helps cause first and second diamond-pointed ends 58 and 56 to move inward on the support member while the compound angle of the hook members as they move along their arcs when a load is placed on the load-bearing portion, as described above, helps to engage the pointed ends further into the support member.

Although the present invention has been described with reference to particular embodiments, it will be apparent to those skilled in the art that variations and modifications can be substituted therefor without departing from the principles and spirit of the invention.

We claim:

1. A hanger to support a load for use on a support member having a front face and first and second parallel sides, comprising:

an unitary structure of bent spring wire having an inherent spring action, said structure including:

a load-bearing portion having first and second exterior sides;

a support member engagement portion having fulcrum means and first and second sharpened ends, said support member engagement portion contiguous with said load-bearing portion, said support member engagement portion engageable on said support member;

said hanger in an original first mode position for engagement on said support member disposed such that inward pressure on said first and second exterior sides of said load-bearing portion causes said support member engagement portion to widen a distance sufficient to encompass said first and second parallel sides of said support member; and said hanger in a second mode disposed such that the subsequent release of such inward pressure urges said hanger by said inherent spring action of said spring wire to return toward its pre-squeezed shape, causing said first and second sharpened ends of said support member engagement portion to engage into said first and second parallel sides of said support member; and said hanger in a third mode disposed such that downward pressure exerted on said load-bearing portion causes said fulcrum means acting against said front face of said support member to aid in forcing said first and second sharpened ends deeper, respectively, into said first and second parallel sides of said support member for the secure engagement of said hanger thereto.

2. A hanger to support a load for use on a support member having a front face and first and second parallel sides, comprising:

an unitary structure of bent spring wire having an inherent spring action, said structure including:
first and second cross members positioned in cross relationship to one another forming a fulcrum, each of said cross members having first and second ends;
a load-bearing portion disposed in a plane forward of said first and second cross members, said load-bearing portion having first and second exterior sides extending, respectively, from said first ends of said first and second cross members;
first and second arm members having, respectively, a first and second top, said first and second arm members extending, respectively, from said second ends of said first and second cross members;
first and second hook members each having, respectively, a first and second end, said first and second hook members each extending downwardly and inwardly, respectively, from said first and second tops of said first and second arm members, said first and second ends of said first and second hook members being sharpened to form first and second sharpened ends; wherein the combination of said first and second cross members, said first and second arm members, said first and second hook members form a support member engagement portion;

said hanger in an first mode position for engagement on said support member disposed for inward pressure on said first and second exterior sides of said load-bearing portion to force said first and second cross members to move oppositely by one another which movement, in turn, causes said first and second arm members to move apart a distance sufficient to encompass said first and second parallel sides of said support member, allowing said first and second cross members to be disposed against said front face of said support member; said hanger in a second mode disposed such that the subsequent release of such inward pressure urges said hanger by said inherent spring action of said spring wire to return toward its pre-squeezed shape, causing said first and second sharpened ends to engage, respectively, into said first and second parallel sides of said support member; and said hanger in a third mode disposed such that downward pressure exerted on said load-bearing portion causes a levering action with said cross members acting as a fulcrum against said front face to cause said first and second hook members to move, respectively, in a first and second arc along said first and second parallel sides with said first and second arms acting as the radius, respectively, of said first and second arcs, to cause said first and second sharpened ends to dig deeper, respectively, into said first and second parallel sides of said support member for the secure engagement of said hanger thereto.

3. The hanger of claim 2 wherein said first and second hook members are each disposed at a compound angle, each being aimed, respectively, both downwardly inward and in a forwardly direction toward said load-bearing portion.

4. The hanger of claim 3 wherein said first and second ends of said first and second hook members are cut, respectively, at an angle in the range of 10 degrees–50 degrees to said plane of said first and second parallel sides to form, respectively, first and second elliptical faces, said first and second elliptical faces having, respectively, a first and second major axis; and wherein said first and second major axis in said third mode are aligned with, and move along, respectively, said first and second arcs.

5. The hanger of claim 4 wherein said first and second arm members each have an upper portion and a lower portion and wherein said upper portions are each bent at approximately a 150-degree angle, respectively, to said lower portions for installation on a non-vertically disposed support member.

6. The hanger of claim 3 wherein said first and second sharpened ends are pointed.

7. A method of providing a hanger for engagement to a support member having a front face having a width and first and second generally parallel sides, comprising the steps of:

providing an unitary piece of bent spring wire having a support member engagement portion comprised of the combination of first and second cross members positioned in cross relationship to one another, each of said cross members having first and second ends; first and second arm members each having a top forming, respectively, first and second tops, said first and second arm members each extending, respectively, from said second ends of said first and second cross members; and first and second hook members each having, respectively, a first and second end, said first and second hook members each extending downwardly inward and forwardly, respectively, from said first and second tops of said first and second arm members, said first and second ends of said first and second hook members being sharpened to form first and second sharpened ends;

providing a load-bearing portion contiguous with said support member engagement portion, said load-bearing portion having compressible first and second exterior sides;

positioning said hanger at a point on said front face of said support member on which it is desired to install said hanger;

manually squeezing said first and second exterior sides of said load-bearing portion;

separating said first and second arm members and their respective first and second hook members by the reciprocating action of said first and second cross members moving by one another a distance apart from one another, said distance between said first and second hook members being at least as wide as the width of said front face;

disposing said first and second hook members, respectively, on said first and second parallel sides of said support member and positioning said first and second cross members against said front face of said support member to act as a fulcrum when a load is placed on said load-bearing portion;

releasing said inward force on first and second exterior sides of said load-bearing portion;

engaging said first and second parallel sides of said support member, respectively, with said first and second sharpened ends, respectively, of said first and second hook members by said reciprocating action of said spring wire hanger to return to its original, pre-squeezed shape;

placing a load providing a downward force on said load-bearing portion; and levering said load-bearing portion by said downward force of said load to cause said first and second cross members to act as a fulcrum against said front face of said support member to provide reciprocal force embed said first and second sharpened ends, respectively, of said first and second hook members into said first and second parallel sides of said support member.

* * * * *